United States Patent [19]

Paul

[11] 4,312,159
[45] Jan. 26, 1982

[54] SUPPORT FOR TRAILER TIP OUTS

[76] Inventor: William A. Paul, 1808 Parkside Blvd., Toledo, Ohio 43607

[21] Appl. No.: 132,264

[22] Filed: Mar. 20, 1980

[51] Int. Cl.³ .............................................. E04B 1/346
[52] U.S. Cl. .......................................... 52/67; 296/26; 296/171
[58] Field of Search .................... 52/67, DIG. 11, 645, 52/646; 296/26, 171

[56] References Cited
U.S. PATENT DOCUMENTS

| | | | |
|---|---|---|---|
| 2,965,412 | 12/1960 | Henderson et al. | 52/67 X |
| 2,987,342 | 6/1961 | Meaker et al. | 296/171 |
| 3,719,386 | 3/1973 | Puckett et al. | 52/67 X |
| 4,049,310 | 2/1977 | Yoder | 296/26 |

Primary Examiner—Price C. Faw, Jr.
Assistant Examiner—Carl D. Friedman
Attorney, Agent, or Firm—Allen D. Gutchess, Jr.

[57] ABSTRACT

A support for a trailer tip out is provided. Larger house trailers, in particular, sometimes have additional rooms or tip outs which are hinged or slide out of side walls of the trailers and moveable through openings therein between a storage position within the trailers and an operating position extending out through the openings from the side walls. Heretofore, the floor of the tip out has been supported above the ground by concrete blocks or the like. These are carried within the trailer and are heavy as well as space consuming. Also, the blocks may shift or sink in the ground and throw off the level of the tip out floor. The new tip out support supports the tip out through the frame of the trailer to eliminate the blocks and any problems caused by shifting or sinking. The tip out support includes an elongate tubular member affixed to the frame of the trailer and a telescoping extension member which can move from a storage position within the tubular member to an extended position with an outer end beneath the tip out. An adjustable post and a jackscrew are carried by the outer end of the moveable member to engage and support the floor of the tip out.

5 Claims, 4 Drawing Figures

SUPPORT FOR TRAILER TIP OUTS

This invention relates to a support for a trailer tip out or additional room.

Many larger house trailers, known as park model trailers, are often towed to a recreational park or area and left for several months or for a season. Some of these trailers have additional rooms or tip outs to provide more space in the trailers. In such an instance, a side wall of the trailer has a large opening therein and the tip out has a lower edge which is hinged to the bottom edge of the opening. The tip out is of a size that it can be swung into the trailer to a storage position on the floor thereof for transportation purposes. In that instance, the opening is closed by a suitable canvas covering or other means. At the desired site, the tip out can then be swung to an operating position through the opening from which it extends from the side wall of the trailer. The side and uppper walls of the tip out have flanges which provide a sealing relationship with the trailer side wall when the tip out is in the operating position.

When in the operating position, most, if not all, tip outs or additional rooms must be supported from the ground. Heretofore, it has been common to achieve this with concrete or similar blocks which are positioned on the ground and built up to a height to engage the floor of the tip out. The concrete blocks usually had to be carried within the trailer. This additional weight reduced gasoline mileage and the blocks were also space consuming. In the event the earth is soft and the blocks sink or shift, the level of the tip out could be thrown off relative to the trailer to present another problem.

The present invention provides a tip out or additional room support for a trailer which provides the support from the main frame of the trailer itself to automatically eliminate any problem due to sinking or shifting. The tip out support includes a tubular, elongate, stationary member having hangers affixing the member to the trailer frame in a position extending transversely of the longitudinal extent of the trailer. A moveable extension member telescopes within the elongate member. The extension member has an adjustable support on the outer end which engages the floor of the tip out to provide the support. The extension member is moveable between a supporting position in which the outer end is near one end of the elongate member and located below the trailer. Thus, the excessive weight and particularly the storage problem with concrete blocks and the like are eliminated.

The adjustable supporting means on the extension member preferably includes an upright post which can be adjusted in several vertical positions through openings and pin means relative to the extension member. Preferably, an adjustable jackscrew is then mounted on the upper end of the upright post for final adjustment.

It is, therefore, a principal object of the invention to provide an improved support for trailer tip outs or additional rooms.

Another object of the invention is to provide a trailer tip out support which supports the tip out through the main frame of the trailer.

Yet another object of the invention is to provide a tip out support which is not affected by sinking or shifting of supporting blocks which could cause damage to the main structure.

Still a further object of the invention is to provide a tip out support which can be stored under the trailer and is quickly moved between a storage position and a supporting position.

Many other objects and advantages of the invention will be apparent from the following detailed description of a preferred embodiment thereof, reference being made to the accompanying drawings, in which.

Figure 1:
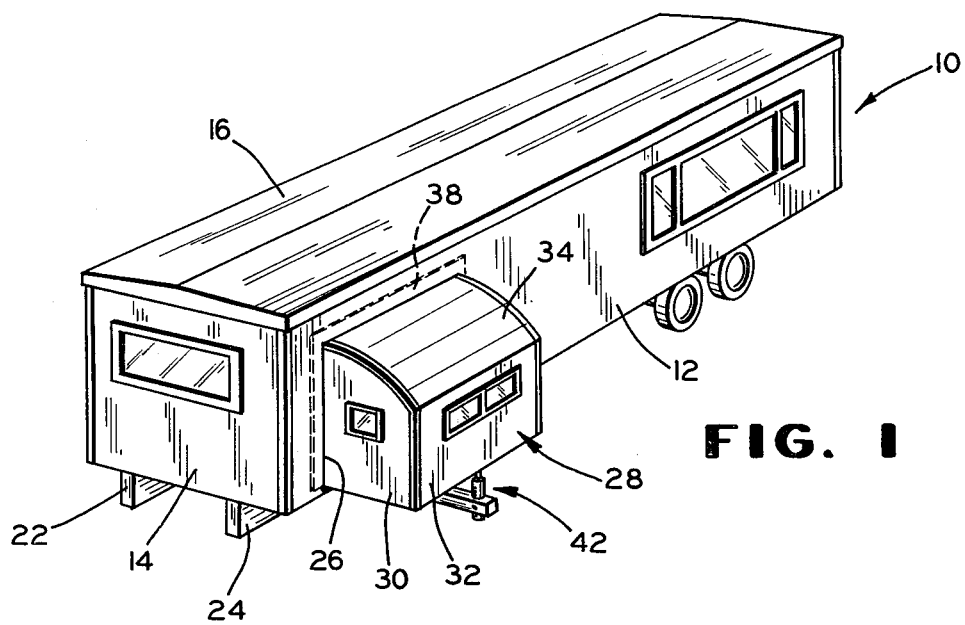
FIG. 1 is a schematic view in perspective of a large trailer having a tip out or additional room with the tip out or room being shown in an extended, operating position, being supported by a tip out support in accordance with the invention.

Referring to FIG. 1, a large, park model trailer is indicated at 10. These are often left at recreational areas or parks for weeks or months at a time but are still mobile. The trailer can include side walls 12, end walls 14, and a roof 16. Underneath a floor 18 of the trailer is a supporting frame indicated at 20. The frame commonly includes two spaced beams 22 and 24 which extend longitudinally of the trailer over a substantial portion of the length thereof. The beams 22 and 24 are shown as box beams but I-beams are also often employed.

In this instance, the trailer 10 has an opening 26 in the side wall 12. An additional room or tip out, as it is commonly known, is indicated at 28 in an operating position extending through the opening 26 from the sidewall 12. The tip out includes upright walls 30 and 32 and a curved roof or top 34 along with a floor 36 shown in FIG. 2. The tip out, when in the operating position, has a flange 38 which engages the side wall 12 around the opening 26 to provide a sealing relationship when the tip out is in the operating position. The tip out also has a hinge 40 connecting the floor 36 with the lower edge of the side wall 12 at the bottom of the opening 26. This enables the tip out to be moved from the operating position inwardly to a storage position in which the flange 38 is adjacent the floor 18 of the trailer. A suitable canvas covering can then be employed to close off the opening 26.

Figure 2:
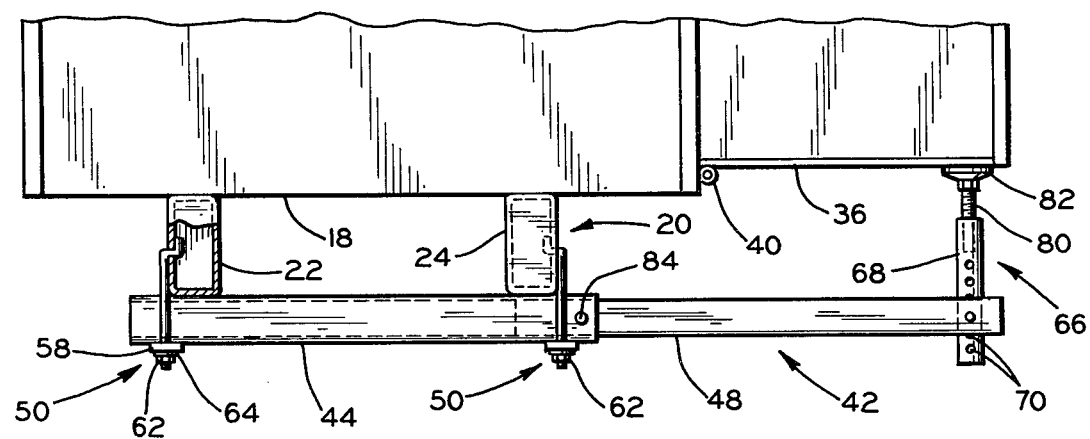
FIG. 2 is a somewhat schematic, fragmentary end view in elevation, with parts broken away, of the trailer tip out and support.
Figure 3:
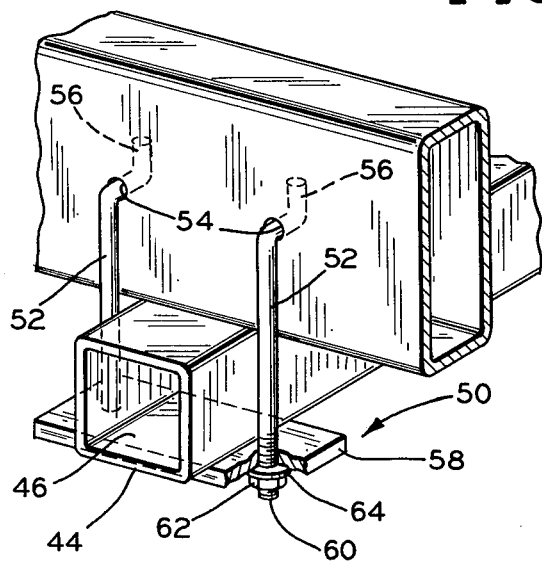
FIG. 3 is a further enlarged, fragmentary view of a portion of the tip out support showing a hanger for attaching part of the support to a frame of the trailer.

In accordance with the invention, a tip out or additional room support is indicated at 42 to support the floor 36 of the tip out 28 from the main frame 20 of the trailer. Consequently, the floor 36 of the tip out will always remain in the same position relative to the floor 18 of the trailer when the support 42 is in the supporting position as shown in FIG. 2. For transportation purposes, the tip out support can be moved to a storage position underneath the trailer 10. Hence, no additional space within the trailer is consumed and the tip out support is also lighter than the concrete blocks or similar supports usually used heretofore for supporting the tip out.

Referring to FIG. 2, the tip out support 42 includes an elongate, tubular, stationary member 34 of square construction and forming a square longitudinally-extending passage 46 therethrough. A tubular, moveable extension member 48 is of a size to closely but moveably fit in the passage 46 of the stationary member 44. Hence, the extension member 48 can move from an extended, supporting position as shown in FIG. 2 to a retracted, storage position within the stationary member 44 during transportation.

The stationary member 44 is affixed to the main frame 20 and preferably to both of the frame beams 22 and 24. For this purpose, a hanger assembly 50 is employed for each of the beams 22 and 24. Each of the hanger assemblies 50 includes a pair of rods or rod-like elongate members 52 having upper ends attached to the beams 22 and 24. In this instance, the beams have openings 54 therein which receive upper offsets 56 of the rods. A cross bar or transverse member 58 extends transversely below the stationary member 44 and beyond the opposite sides thereof. The cross bar 58 is suitably attached to the lower ends of the rods 52, as by the lower ends of the rods being threaded at 60 to receive nuts 62 and washers 64. While other hangers can be used, the hanger assemblies 50 enable the tip out support 42 to be affixed to the trailer only by drilling the holes 54 in the beams 22 and 24. Of course, other hook designs for the rods 52 will be needed for other types of beams, such as I-beams, used in the trailer frame 20.

Figure 4:
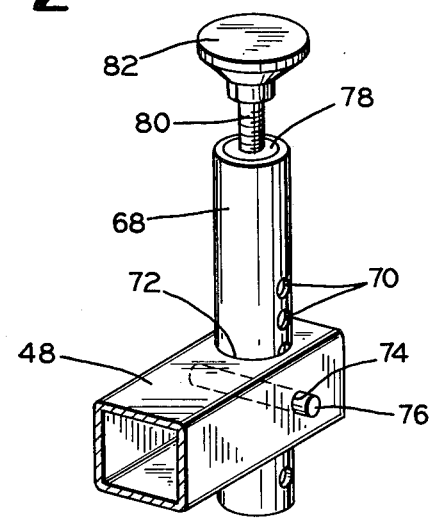
FIG. 4 is a view in perspective of adjustable upright supporting means located at an outer extremity of the tip out support.

Adjustable upright supporting means indicated at 66 is located at the outer extremity of the extension member 48. The supporting means includes an upright post 68 having a plurality of pairs of spaced holes 70 therein. The post 68 extends through openings 72 in the extension member 48, as shown in FIG. 4, with the extension member also having side holes 74 therein. The post 68 is adjusted vertically relative to the extension member 48 by a pin 76 which extends through the holes 74 and through one of the pairs of holes to which are aligned therewith.

The upper end of the post 68, which is also tubular, has a threaded block 78 suitably affixed therein, as by welding. A threaded shank 80 having an upper supporting pad 82 is threadedly received in the block 78 and provides the final adjustable support and contact between the pad 82 and the tip out floor 36 after initial adjustment is made between the post 68 and the extension member 48.

When the extension member 48 is in the telescoped, retracted position relative to the stationary member 44, the openings 74 in the outer end of the extension 48 can be aligned with end openings 84 (FIG. 2) of the stationary member 44. The pin 76 or another suitable pin can be extended through the openings 74 and 84 to hold the extension member 48 in the storage position when the trailer is being towed.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In a trailer having an opening in a wall thereof, an additional room moveable between a storage position within the trailer and an operation position extending through said opening from said wall, and two spaced beams underneath said trailer, supporting means for supporting said additional room when in the operating position, said supporting means comprising a hollow stationary member, means affixing said stationary member to said beams, a moveable member telescoping in said stationary member and moveable relative thereto, said moveable member having one position in which an end portion is under said additional room and another position in which the end portion is under the trailer, upright means carried by the end portion of said moveable member for engaging and supporting said additional room when in the operating position, and separate from said additional room when in the storage position, said stationary member having transverse openings therein, said moveable member having transverse openings therein, said openings being aligned when the end portion of said moveable member is in the position under said trailer, whereby a pin can be extended through said transverse openings to hold said moveable member immovable relative to said stationary member.

2. A trailer according to claim 1 characterized by said means for affixing said stationary member to said beams comprising a hanger assembly for each of said beams, each of said hanger assemblies comprising a pair of rod-like members having upper ends removable attached to the respective beam, a cross member below said stationary member, and means for removably affixing said cross member to lower ends of said rod-like members.

3. In a trailer having an opening in a side wall thereof, a tip out movable between a storage position within the trailer and an operating position extending through said opening from said side wall, and a frame beneath said trailer, supporting means for said tip out comprising an elongate hollow member, means affixing said elongate hollow member to said frame, an extension member telescoping within said elongate member and moveable relative thereto, said extension member having one position in which an extremity thereof is under said tip out and another position in which the extremity thereof is under said trailer, said extremity of said extension member having two vertically aligned openings therein, an upright post extending through said openings of said extremity, means carried by said upright post for vertically adjusting said post relative to said extension member, and said upright post having a jackscrew at the upper end thereof for engaging the tip out when the tip out is in the operating position and being spaced from the tip out when the tip out is in the storage position.

4. A trailer according to claim 3 characterized by said extremity of said extension member having aligned side holes therein, said upright post having diametrically opposite holes in vertically spaced pairs, and a pin extendible through said aligned holes of said extremity and one of said pairs of holes in said post.

5. A trailer according to claim 4 characterized by said elongate member having side openings in an end portion thereof, said side openings of said elongate member being aligned with said side holes of said extension member when said extension member is in said another position in which the extremity thereof is under said trailer, and a pin extending through said side holes of said extension member and said side openings of said elongate member to hold said extension member in position when the tip out is in the storage position and the trailer is in motion.

* * * * *